(12) United States Patent
Morrison et al.

(10) Patent No.: US 11,474,955 B2
(45) Date of Patent: Oct. 18, 2022

(54) MEMORY DISABLEMENT FOR DATA SECURITY

(71) Applicant: Micron Technology, Inc., Boise, ID (US)

(72) Inventors: Shea M. Morrison, Boise, ID (US); Brenton P. Van Leeuwen, Boise, ID (US); Blakely N. Frechette, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/124,312

(22) Filed: Dec. 16, 2020

(65) Prior Publication Data

US 2021/0103527 A1 Apr. 8, 2021

Related U.S. Application Data

(62) Division of application No. 16/204,656, filed on Nov. 29, 2018, now Pat. No. 10,884,951.

(51) Int. Cl.
G06F 12/14 (2006.01)
G06F 21/55 (2013.01)
G11C 5/14 (2006.01)
G11C 16/22 (2006.01)

(52) U.S. Cl.
CPC ........... G06F 12/14 (2013.01); G06F 21/554 (2013.01); G11C 5/145 (2013.01); G11C 16/22 (2013.01); *G06F 2212/1052* (2013.01); *G06F 2221/034* (2013.01)

(58) Field of Classification Search
CPC .................................................... G11C 16/22
See application file for complete search history.

(56) References Cited

U.S. PATENT DOCUMENTS

| | | | |
|---|---|---|---|
| 4,270,168 A | 5/1981 | Murphy | |
| 4,538,245 A * | 8/1985 | Smarandoiu | G11C 29/838 365/185.04 |
| 5,406,261 A | 4/1995 | Glenn | |
| 5,530,724 A | 6/1996 | Abrams et al. | |
| 6,404,217 B1 | 6/2002 | Gordon | |
| 7,180,777 B2 | 2/2007 | Salessi et al. | |
| 9,317,422 B1 | 4/2016 | Winters et al. | |
| 10,546,644 B2 | 1/2020 | Chen | |
| 2015/0277790 A1 | 10/2015 | Mozak et al. | |

* cited by examiner

*Primary Examiner* — Douglas King
(74) *Attorney, Agent, or Firm* — Brooks, Cameron & Huebsch, PLLC

(57) ABSTRACT

Apparatuses and methods related to memory disablement for memory security. Disabling the memory for memory security can include, responsive to receiving a trigger signal, provide a voltage, which may be in excess of an operating or nominal voltage, to the access circuitry. The voltage may thus be sufficient to render the access circuitry inoperable for accessing data stored in the memory array.

19 Claims, 4 Drawing Sheets

MEMORY DISABLEMENT FOR DATA SECURITY

PRIORITY INFORMATION

This application is a Continuation of U.S. application Ser. No. 16/204,656, filed Nov. 29, 2018, the contents of which are included herein by reference.

TECHNICAL FIELD

The present disclosure relates generally to memory, and more particularly to apparatuses and methods associated with protecting memory by disabling the memory.

BACKGROUND

Memory devices are typically provided as internal, semiconductor, integrated circuits in computers or other electronic devices. There are many different types of memory including volatile and non-volatile memory. Volatile memory requires power to maintain its data and includes random-access memory (RAM), dynamic random-access memory (DRAM), and synchronous dynamic random-access memory (SDRAM), among others. Non-volatile memory can provide persistent data by retaining stored data when not powered and can include NAND flash memory, NOR flash memory, read-only memory (ROM), Electrically Erasable Programmable ROM (EEPROM), Erasable Programmable ROM (EPROM), and resistance variable memory such as phase change random-access memory (PCRAM), resistive random-access memory (RRAM), and magnetoresistive random-access memory (MRAM), among others.

Memory is also utilized as volatile and non-volatile data storage for a wide range of electronic applications. Volatile and non-volatile memory may be used in, for example, personal computers, portable memory sticks, digital cameras, cellular telephones, portable music players such as MP3 players, movie players, and other electronic devices. Memory cells can be arranged into arrays, with the arrays being used in memory devices.

Various computing systems include a number of processing resources that are coupled to memory (e.g., a memory system), which is accessed in association with executing a set of instructions (e.g., a program, applications, etc.). The memory system may be vulnerable to security threats. For example, the memory system may be vulnerable to security threats originating from a processing resource, among other types of security threats.

DETAILED DESCRIPTION

Figure 1:
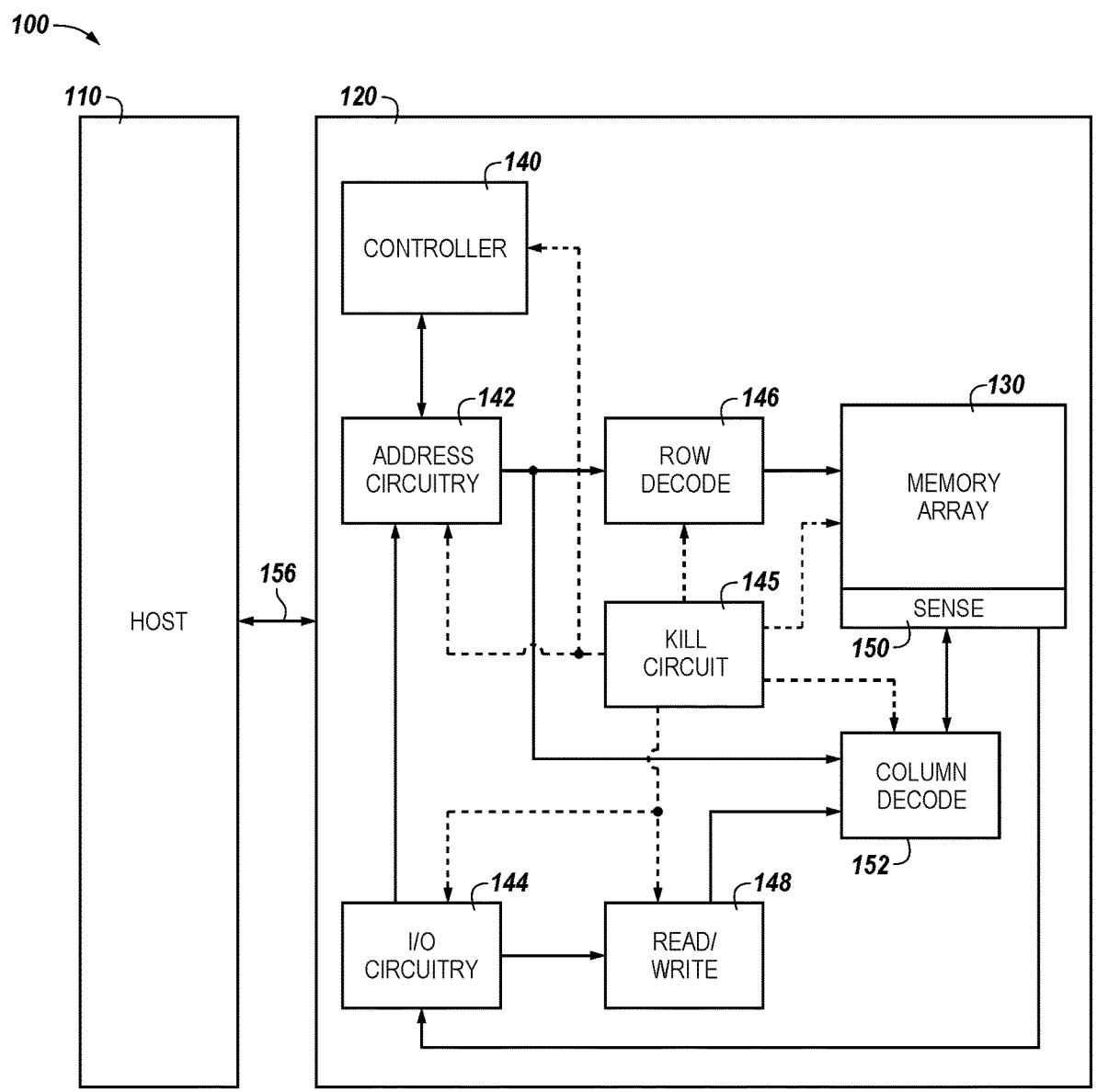
FIG. 1 is a block diagram of an apparatus in the form of a computing system including a memory device in accordance with a number of embodiments of the present disclosure.

The present disclosure includes apparatuses and methods related to disabling memory based on security threats. Security threats may target memory devices. A memory device may rely on a host for implementing security measures to prevent security threats to the memory device. However, implementing security measures at the memory device may further improve security and may mitigate unauthorized memory accesses.

In various embodiments, a memory device can respond to a security threat by disabling itself. As used herein a security threat describes a danger that exploits vulnerabilities to breach security and cause harm. Security threats can include hardware security threats and/or software security threats.

Computations performed by physical devices can leave observable side effects beyond the computation's nominal outputs. Side channel attacks exploit vulnerabilities including the side effects to extract otherwise unavailable privileged data from memory devices. For example, a side channel attack can include accessing privileged data stored in the cache.

Two examples of side channel attacks include a meltdown attack and a specter attack. A meltdown attack is a side channel attack that enables data values to be discerned from cache misses. A specter attack allows for speculative execution of instructions to perform privileged operations that leak information. While the vulnerabilities exploited in both attacks can be eventually identified and resolved, the attacks execute instructions to access privileged information in real time.

The meltdown attack relies on speculative execution to reveal the content of a memory location. Processing resources can map the kernel into the user's address space to facilitate faster traps and access. However, the processing resources may not have permission to operate on the kernel address space. A processing resource may be configured to perform an illegal/privileged memory operation while verifying a branch to be selected. In reverting the illegal memory operation, a processing resource may throw an exception. The malicious code, through the processing resource, may suppress the exception and determine which array cache line is in the cache to access the privileged data.

Specter attacks exploit speculative execution and miss-train a processing resource's branch target buffer (BTB). A BTB is a portion of a processing resource that predicts the target of a taken conditional branch or an unconditional branch instruction before the target of the branch instruction is computed by the execution unit of the processing resource. Once again, in the specter attack, the processing resource can be configured to access privileged data and place the privileged data in the cache. The data can then be extracted from the cache.

Another example of a security threat is a row hammer attack in which a row of a memory array (e.g., DRAM array) is repeatedly accessed causing bit flipping in adjacent rows (e.g., due to charge leakage). Therefore, row hammering can be exploited by an attacker to change stored data values, which can result in the ability to obtain higher privileges, for instance. Upon identification of a security threat (e.g., attack), it can be beneficial to quickly and efficiently prevent further access to the memory device (e.g., by deactivating the memory device, rendering inoperable, etc.). For example, identification of a security threat can serve as a triggering event to disable a memory device in accordance with various embodiments described herein.

The security threats can be identified by the memory device being targeted and/or by a different apparatus. For example, the security threat can be identified by a host, a controller external to the memory device, and/or a different memory device. As such, upon identification of a security threat, the host, the controller external to the memory device, a different memory device, and/or the memory device being targeted can initiate the deactivation/disablement of the memory device.

The memory device can be disabled by rendering the memory device inoperable. A memory device can be rendered inoperable by damaging one or more portions of the memory device such that the memory device is not compromised by the threat. Rendering the memory device inoperable prevents the operation of the memory device and reduces the attacking surface for security threats. For example, a security threat cannot access a memory device if the memory device is inoperable or portions of the memory device are inoperable. In some examples, memory devices are rendered inoperable as a last resort to preventing a security threat.

As used herein, "a number of" something can refer to one or more of such things. For example, a number of memory devices can refer to one or more memory devices. A "plurality" of something intends two or more. Additionally, designators such as "N," as used herein, particularly with respect to reference numerals in the drawings, indicates that a number of the particular feature so designated can be included with a number of embodiments of the present disclosure.

The figures herein follow a numbering convention in which the first digit or digits correspond to the drawing figure number and the remaining digits identify an element or component in the drawing. Similar elements or components between different figures may be identified by the use of similar digits. As will be appreciated, elements shown in the various embodiments herein can be added, exchanged, and/or eliminated so as to provide a number of additional embodiments of the present disclosure. In addition, the proportion and the relative scale of the elements provided in the figures are intended to illustrate various embodiments of the present disclosure and are not to be used in a limiting sense.

FIG. 1 is a block diagram of an apparatus in the form of a computing system 100 including a memory device 120 in accordance with a number of embodiments of the present disclosure. As used herein, a memory device 120, a memory array 130, and/or a host 110 might also be separately considered an "apparatus."

In this example, system 100 includes a host 110 coupled to memory device 120 via an interface 156. The computing system 100 can be a personal laptop computer, a desktop computer, a digital camera, a mobile telephone, a memory card reader, or an Internet-of-Things (IoT) enabled device, among various other types of systems. Host 110 can include a number of processing resources (e.g., one or more processors, microprocessors, or some other type of controlling circuitry) capable of accessing memory device 120. The system 100 can include separate integrated circuits, or both the host 110 and the memory device 120 can be on the same integrated circuit. For example, the host 110 may be a system controller of a memory system comprising multiple memory devices 120, such as a memory module (e.g., DIMM), with the system controller 110 providing access to the respective memory devices 120 by another processing resource such as a central processing unit (CPU). In the example shown in FIG. 1, the host 110 is responsible for executing an operating system (OS) and/or various applications that can be loaded thereto (e.g., from memory device 120 via controller 140).

For clarity, the system 100 has been simplified to focus on features with particular relevance to the present disclosure. The memory array 130 can be a DRAM array, SRAM array, STT RAM array, PCRAM array, TRAM array, RRAM array, NAND flash array, and/or NOR flash array, for instance. The array 130 can comprise memory cells arranged in rows coupled by access lines (which may be referred to herein as word lines or select lines) and columns coupled by sense lines (which may be referred to herein as digit lines or data lines). Although a single array 130 is shown in FIG. 1, embodiments are not so limited. For instance, memory device 120 may include a number of arrays 130 (e.g., a number of banks of DRAM cells).

The memory device 120 includes address circuitry 142 to latch address signals provided over an interface 156. The interface 156 can include, for example, a physical interface employing a suitable protocol (e.g., a data bus, an address bus, a command bus, or a combined data/address/command bus). Such protocol may be custom or proprietary, or the interface 156 may employ a standardized protocol, such as Peripheral Component Interconnect Express (PCIe), Gen-Z, CCIX, or the like. Address signals are received and decoded by a row decoder 146 and a column decoder 152 to access the memory array 130. Data can be read from memory array 130 by sensing voltage and/or current changes on the sense lines using sensing circuitry 150. The sensing circuitry 150 can comprise, for example, sense amplifiers that can read and latch a page (e.g., row) of data from the memory array 130. The I/O circuitry 144 can be used for bi-directional data communication with host 110 over the interface 156. The read/write circuitry 148 is used to write data to the memory array 130 or read data from the memory array 130. As an example, the circuitry 148 can comprise various drivers, latch circuitry, etc.

Controller 140 decodes signals provided by the host 110. These signals can include chip enable signals, write enable signals, and address latch signals that are used to control operations performed on the memory array 130, including data read, data write, and data erase operations. In various embodiments, the controller 140 is responsible for executing instructions from the host 110. The controller 140 can comprise a state machine, a sequencer, and/or some other type of control circuitry, which may be implemented in the form of hardware, firmware, or software, or any combination of the three.

In accordance with various embodiments, the memory device 120 can also include additional circuitry 145, which may be referred to herein as a kill circuit 145. In various embodiments, the kill circuit 145 can comprise a voltage pump, among other circuitry. The voltage pump associated with the kill circuit 145 may be a voltage pump used to provide various operating voltages for the memory device 120, or the voltage pump may be a separate voltage pump dedicated to providing over-voltages as described further herein. Accordingly, the kill circuit 145 may utilize an existing voltage pump (e.g., one or more voltage pumps in a conventional memory device) or may implement a new voltage pump. The voltage pump can raise or lower a voltage received. For example, a voltage pump associated with the kill circuit 145 can receive a first voltage and generate a second voltage that is greater than the first voltage. In some examples, the voltage pump associated with the kill circuit 145 can generate different voltages based on the quantity of stages that comprise the voltage pump. In some examples, the voltage pump associated with the kill circuit 145 can utilize capacitors for energetic charge storage to raise or lower a voltage.

The voltage pump associated with the kill circuit 145 can receive a first voltage and generate a second voltage from the first voltage, where the second voltage is greater than the first voltage. The first voltage can be provided to the voltage pump associated with the kill circuit 145 by a host, a controller, a memory device, and/or a different apparatus that is independent of the kill circuit 145. In such examples, the first voltage can be described as being generated by software. That is, computer readable instructions (e.g., software and/or firmware) can instruct hardware, such as a processing resource, to provide a voltage to the voltage pump associated with the kill circuit 145.

In other examples, the voltage pump associated with the kill circuit 145 can provide an over-voltage based on a trigger signal, which can be provided to the kill circuit 145 as a control signal. The trigger signal can be used to control whether the over-voltage generated by the voltage pump associated with the kill circuit 145 is provided to the memory device 120.

The trigger signal can be generated from light, radio waves, and/or gamma rays, among other possible signal sources. The circuitry can receive gamma rays and generate the trigger signal from the gamma rays. The circuitry can receive radio waves and generate the trigger signal from the radio waves. In some examples, the trigger signal is generated in response to measuring a threshold amount of signal sources (e.g., light, the gamma rays, and/or the radio waves)

In some examples, the circuitry can process the received light, radio waves, and/or gamma rays before the trigger signal is generated from the light, radio waves, and/or gamma rays. For example, the radio waves received can be processed to generate data such as a token (e.g., password). If the token is recognized as providing access to the kill circuit 145, then the circuitry can provide a trigger signal generated from the light, radio waves, and/or gamma rays to the kill circuit 145. The trigger signal can be provided to the kill circuit 145 as a control signal to provide the over-voltage generated by the voltage pump to the memory device 120.

The stimuli (e.g., light, radio waves, and/or gamma rays) used to generate the trigger signal can be independent from the system 100. For example, stimuli used to generate the trigger signal can be provided from a source independent of the system 100. The security threat to the system 100 and/or the memory device 120 can be reported to a source external to the system 100. The source external to the system 100 can provide the stimuli (e.g., light, radio waves, and/or gamma rays, among other stimuli) to the system 100. Providing the stimuli from a source external to the system 100 provides an added level of extraction from the system 100 that prevents security threats from accessing the system 100 and/or the source of the stimuli. The security threat to the system 100 can be referred to as a trigger event. The trigger event can be a determined security breach, misplacement of the device, etc.

Providing an independent source of the stimuli can provide for remote deactivation of the memory device 120. For example, light, radio waves, and/or gamma rays can be provided from a physical location of the system 100 and/or from a physical location different from the physical location of the system 100.

Providing an independent source of the stimuli can provide for the deactivation of a plurality of memory devices from a single stimulus. For example, a plurality of memory devices of the system 100 can be deactivated from a single stimulus and/or a plurality of memory device of a plurality of systems can be deactivated from a single stimulus. As such, an entire data center comprising a plurality of systems (e.g., systems 100) can be deactivated from a single stimulus and/or a plurality of stimuli responsive to the identification of a security threat.

The kill circuit 145 can be coupled to the controller 140, the address circuitry 142, the row decoder 146, the memory array 130/the sensing circuitry 150, the column decoder 152, the read/write circuitry 148, and/or the I/O circuitry 144, among other apparatuses of the memory device 120. The dotted lines coupling the kill circuit 145 to the different apparatuses of the memory device 120 denote possible couplings. For example, the kill circuit 145 can be coupled to some or all of the different apparatuses of the memory device 120.

Figure 3:
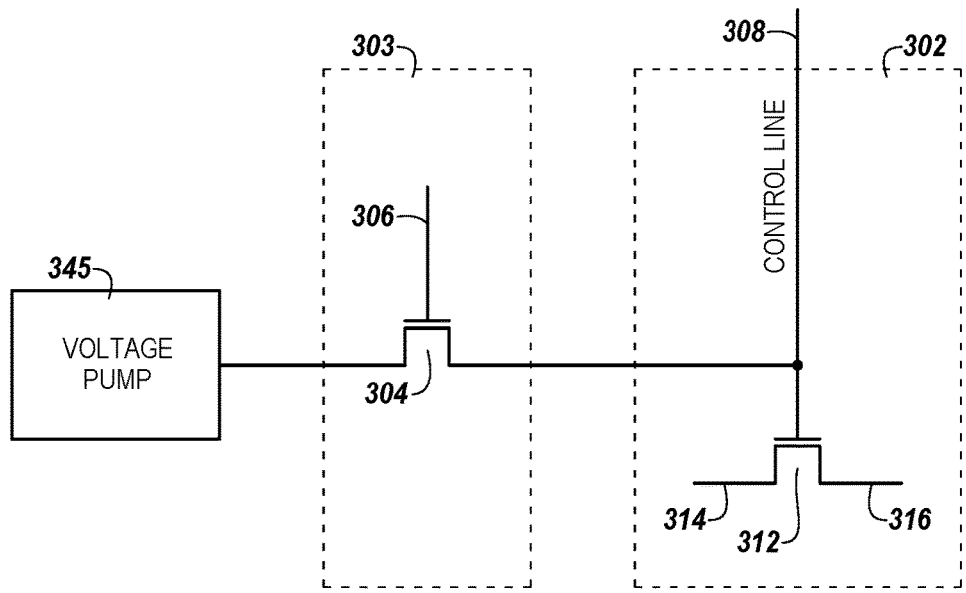
FIG. 3 is a block diagram of access circuitry in accordance with a number of embodiments of the present disclosure.

The kill circuit 145 can generate a voltage that when received by the row decoder 146, for example, can render the row decoder 146 inoperable. FIG. 3 describes how a voltage provided by the kill circuit 145 can render an apparatus inoperable.

The kill circuit 145 can be on a same die as the apparatus receiving the voltage from the kill circuit 145. For example, the kill circuit 145 can be on a same die as the controller 140, the address circuitry 142, the row decoder 146, the memory array 130/the sensing circuitry 150, the column decoder 152, the read/write circuitry 148, and/or the I/O circuitry 144. In some examples, the kill circuit 145 can be on a different die as shown in FIG. 2.

The voltage generated by the voltage pump of the kill circuit 145 can be routed to a portion of the apparatuses as shown in FIG. 3. The voltage generated by the voltage pump of kill circuit 145 can be an over-voltage, which can be referred to as a kill voltage. The over-voltage is a voltage that is greater than a rated voltage of an access circuit. Providing an over-voltage to an access circuit can result in an abnormal function of the access circuit or can render the access circuit inoperable. A rated voltage can be referred to as a specification voltage or a nominal voltage. The rated voltage is a voltage at which the access circuit is designed to operate. Each of the apparatuses, including the controller 140, the address circuitry 142, the row decoder 146, the memory array 130/the sensing circuitry 150, the column decoder 152, the read/write circuitry 148, and/or the I/O circuitry 144 can include access circuitry. Disabling the access circuitry of an apparatus can result in the disablement of the apparatus. Providing a voltage that is greater than a voltage that the access circuitry is configured to receive can result in damage to the access circuitry which can render the apparatus inoperable. Rendering the apparatus inoperable can render the memory device 120 or a portion of the memory device 120 inoperable. Rendering the memory device 120 inoperable prevents a security threat from utilizing the memory device 120 and prevents access to the data stored in the memory device 120.

Figure 2:
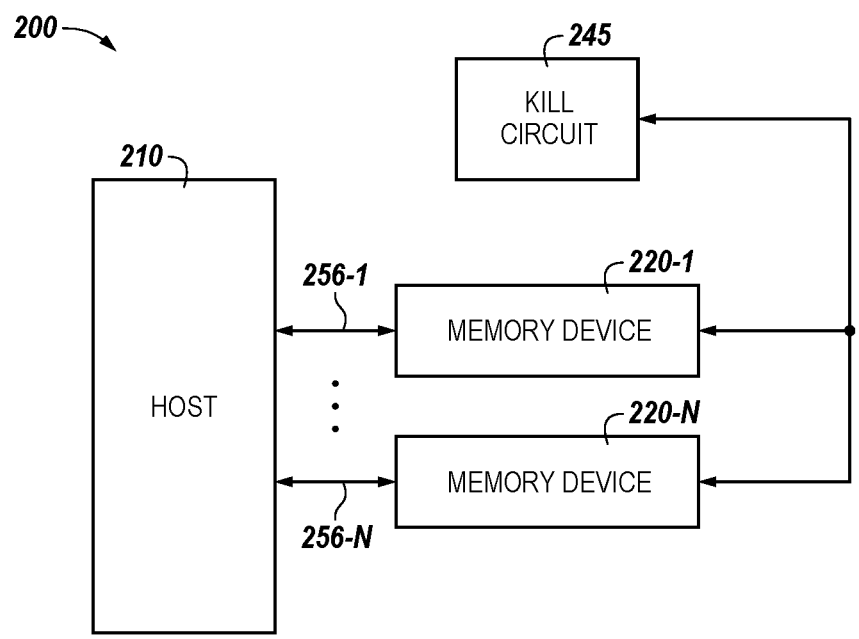
FIG. 2 is a block diagram of an apparatus in the form of a computing system including memory devices in accordance with a number of embodiments of the present disclosure.

FIG. 2 is a block diagram of an apparatus in the form of a computing system 200 including memory devices 220-1 to 220-N in accordance with a number of embodiments of the present disclosure. The memory devices 220-1 to 220-N can be referred to as memory devices 220. The computing system 200 is analogous to the computing system 100 in FIG. 1.

The host 210 can be coupled to the memory devices 220 through interfaces 256-1 to 256-N. For example, the host 210 is coupled to the memory device 220-1 via the interface 256-1 and to the memory device 220-N via the interface 256-N. The interfaces 256-1 to 256-N can be referred to as interfaces 256 and are analogous to interface 156 in FIG. 1. The interfaces 256 can be data buses, command buses, and/or address buses, among other types of buses.

Although FIG. 2 shows the host 210 as being coupled to the memory devices 220 via different interfaces, the host 210 can be coupled to the memory devices 220 via a single interface. For example, the memory devices 220 can be part of a memory system such that the host 210 is coupled to the memory system through one or more interfaces and not directly coupled to the memory devices 220 through different interfaces.

The kill circuit 245 is shown as being coupled to the memory devices 220. While FIG. 1 shows the kill circuit 145 as being internal to a memory device 120, the kill circuit 245 can also be external to the memory devices 220. As such, the kill circuit 245 can be configured to provide a voltage to one or more of the memory devices 220 simultaneously (e.g., at a same time). In some examples, a controller external to the memory devices 220 is configured to rout the voltage provided by the kill circuit 245 to the memory devices 220.

The kill circuit 245 can be hosted on its own module and/or a module comprising a plurality of memory devices 220. That is, the kill circuit 245 can be placed on a separate die than the die on which the memory devices 220 are placed. For example, each of the memory devices 220 and the kill circuit 245 can be hosted by a different die. As such, the kill circuit 245 can be independent of the memory devices 220 and/or the host 210.

FIG. 3 is a block diagram of access circuitry 302 in accordance with a number of embodiments of the present disclosure. The access circuitry 302 can be part of an apparatus such as a controller, address circuitry, a row decoder, a memory array, sensing circuitry, a column decoder, the read/write circuitry, and/or I/O circuitry, among other apparatuses that comprise a memory device.

FIG. 3 shows a voltage pump 345, triggering circuitry 303, and the access circuitry 302. As described herein, the voltage pump 345 is associated with kill circuitry (e.g., 145/245) and can be used to provide an over-voltage in accordance with embodiments described herein. As noted above, the voltage pump 345 may be an existing voltage pump used to provide various operating voltages within a memory device, or the voltage pump may be a separate voltage pump dedicated to providing over-voltages. In some examples, the access circuitry 302 can be part of an apparatus which is being disabled (e.g., due to a detected security threat). In other examples, the access circuitry 302, the voltage pump 345, and/or the triggering circuitry 303 can be part of the apparatus which is being disabled. The term access expresses the function of the access circuitry 302 in the apparatus such that the apparatus or a portion of the apparatus may cease functioning (e.g., may cease providing access to data) if the access circuitry 302 ceases to function.

The voltage pump 345 is coupled to the triggering circuitry 303. The triggering circuitry 303 can comprise a trigger line 306 and switching circuitry, which in this example comprises a transistor 304. The trigger line 306 can provide a trigger signal. The trigger signal can activate or deactivate the transistor 304. A voltage generated by the pump 345 can be provided from the voltage pump 345 to the access circuitry 302 if the transistor 304 is activated and may not be provided to the access circuitry 302 if the transistor 304 is not activated. As such, the trigger signal can be used to provide the voltage generated by the voltage pump 345 to the access circuitry 302.

The trigger signal can be a control signal for the trigger circuitry 303. This trigger circuitry 303 can be comprised of a single transistor 304 or it can be comprised of multiple circuit elements for various purposes. In some examples, the trigger circuitry 303 can receive multiple trigger signals to reroute a voltage to a plurality of access circuitry.

Although the transistor 304 and the transistor 312 are shown has having a source terminal, a drain terminal, and a gate terminal, other types of transistors can be used. For example, transistors 312 comprising multiple source terminals or drain terminals can be utilized. In some examples, other components other than the transistor 304 and/or the transistor 312 can be utilized to achieve the same functionality. For instance, a different portion of the access circuitry 302 can be damaged to render the access circuitry 302 inoperable.

The access circuitry 302 comprises a control line 308. The control line 308 can be used to provide a voltage to the transistor 312 to activate the transistor 312 or deactivate the transistor 312. The voltage generated by the voltage pump 345 and provided by the triggering circuitry 303 can be received by the control line 308. The voltage generated by the voltage pump 345 can be received at the transistor 312. The voltage generated by the voltage pump 345 can be received at a gate of the transistor 312. The transistor 312 can be coupled to a source line 314 and a drain line 316. The source line 314 and the drain line 316 can be utilized to activate a function of an apparatus comprising the access circuitry 302.

In some examples, the first voltage provided by the triggering circuitry 303 can be greater than a second voltage provided via the control line 308. The transistor 312 can be configured to receive a voltage below a threshold at a gate terminal. The control line 308 can provide the second voltage that is less than the threshold. The first voltage can be greater than the threshold. By providing the first voltage through the control line 308 and to a gate terminal of the transistor 312, the transistor 312 can be damaged such that the drain line 316 may not conduct the voltage provided by the source terminal line. Preventing the drain line 316 from conducting a voltage can render the control circuitry 302 inoperable, an apparatus comprising the control circuitry 302 inoperable, and/or a memory device comprising the apparatus inoperable.

Figure 4:
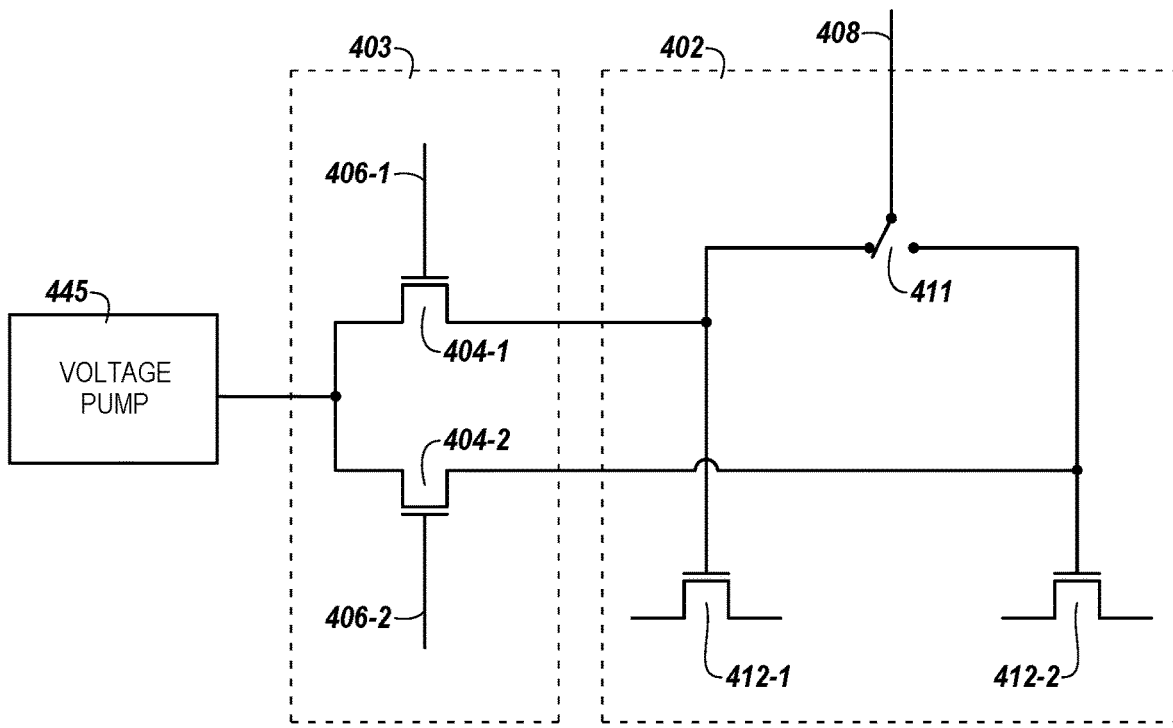
FIG. 4 is a block diagram of access circuitry in accordance with a number of embodiments of the present disclosure.

FIG. 4 is a block diagram of access circuitry 402 in accordance with a number of embodiments of the present disclosure. FIG. 4 includes the voltage pump 445, the triggering circuitry 403, and the access circuitry 402.

The control circuitry 403 can comprise the transistors 404-1 and 404-2. The transistor 404-1 can receive a first trigger signal at a gate terminal via the trigger line 406-1. The transistor 404-2 can receive a second trigger signal at a gate terminal via the trigger line 406-2.

The access circuitry 402 can comprise a redundant access circuitry. For example, a first access circuitry and a second access circuitry can comprise the access circuitry 402. In some examples, the first access circuitry and the second access circuitry can fulfil the same function or may fulfil different functions within an apparatus. For instance, the second access circuitry can be activated responsive to the first access circuitry being deactivated and/or inoperable.

The access circuitry 402 can receive a voltage (e.g., control voltage) through the control line 408. The access circuitry 402 can be coupled to a switch 411 such that only one of the first access circuitry or the second access circuitry is activated at a same time. In other examples, each of the first access circuitry and the second access circuitry is coupled to a different control line such that the first access circuitry is independent of the second access circuitry.

The switch 411 can route the voltage provided by the control line 408 to the transistor 412-1 or the transistor 412-2. The switch 411 can activate the transistor 412-1 or the transistor 412-2. For example, the switch 411 can activate the transistor 412-1 based on the inoperability of the transistor 412-2 or the transistor 412-2 based on the inoperability of the transistor 412-1.

The transistor 404-1 can provide a voltage from the voltage pump 445 to the transistor 412-1 through a gate terminal of the transistor 412-1. The transistor 404-1 can provide the voltage utilizing a first trigger signal provided via the trigger line 406-1. The transistor 404-2 can provide a voltage from the voltage pump 445 to the transistor 412-2 through a gate terminal of the transistor 412-2. The transistor 404-2 can provide the voltage utilizing a second trigger signal provided via the trigger line 406-2. Providing a different trigger line to each of the transistors 404-1 and 404-2 can provide the ability to control each of the transistors 404-1 and 404-2 independently of the other transistor.

Operating the transistors 404-1 and 404-2 independent of each other allows for the voltage generated by the voltage pump 445 to be provided to the transistors 412-1 and/or the transistor 412-2. Accordingly, the transistor 412-1 can be rendered inoperable by providing a voltage from the transistor 404-1 to the transistor 412-1. The transistor 412-2 can be rendered inoperable by providing a voltage from the transistor 404-2 to the transistor 412-2. The transistors 412-1 and 412-2 can be rendered inoperable regardless of the configuration of the switch 411.

After the transistor 412-1 has been rendered inoperable, the switch 411 can be configured to provide a control voltage (e.g., control signal) to the transistor 412-2 to render the access circuitry 402 operable. Providing the control voltage to the transistor 412-2 can also render the apparatus and/or the memory device operable after the apparatus and/or the memory device were rendered inoperable. In some examples, the transistor 404-2 and the trigger line 406-2 may not be present to disable the redundant access circuitry. That is, redundant access circuitry can be provided without coupling the redundant access circuitry to the triggering circuitry 403.

Figure 5:
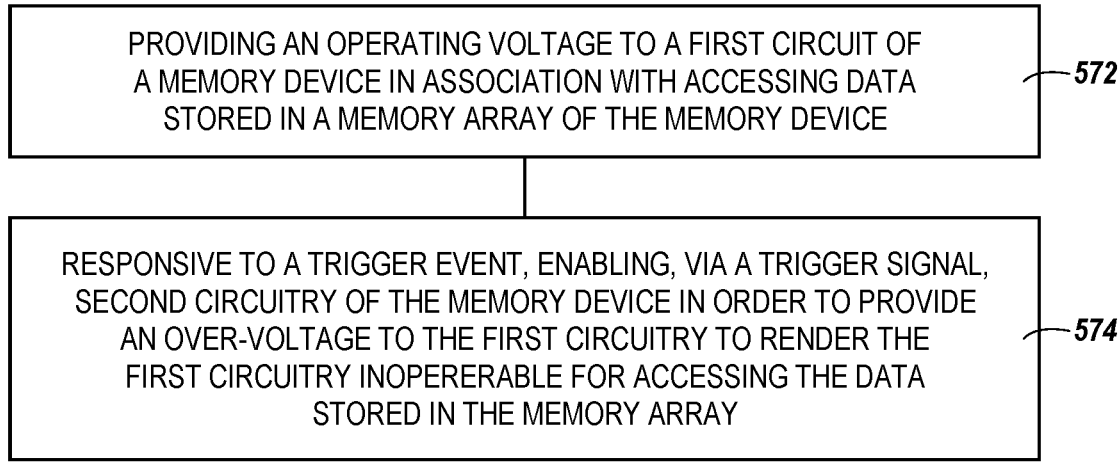
FIG. 5 illustrates an example flow diagram of a method for disabling memory responsive to security threats in accordance with a number of embodiments of the present disclosure.

FIG. 5 illustrates an example flow diagram of a method for disabling memory responsive to security threats in accordance with a number of embodiments of the present disclosure. The method can be executed by a memory device of a computing system.

At 572, an operating voltage can be provided to a first circuitry of a memory device in association with accessing data stored in a memory array of the memory device. The first circuitry can be configured to receive the operation voltage to provide access to data stored in the memory array. At 574, responsive to a trigger event, a second circuitry of the memory device can be enabled via a trigger signal to provide a kill voltage to the first circuitry to render the first circuitry inoperable for accessing the data stored in the memory array. The trigger event can be a threat to the data stored in the memory array and/or a threat to the memory array, memory device, memory system, and/or computing system used to store the data.

The kill voltage can be sufficient to damage at least a portion of the first circuitry. The kill voltage can be provided to the first circuitry from a voltage pump on die with the memory array. The voltage pump can provide a plurality of different voltages including the kill voltage. In various examples, the operating voltage is a rated voltage at which the first circuitry is configured to operate. The kill voltage can be a higher voltage than a rated voltage. The source of the operating voltage and the kill voltage can be generated from the same source. The trigger signal can be used to select which of the operating voltage or the kill voltage is provided to the first circuitry.

Figure 6:
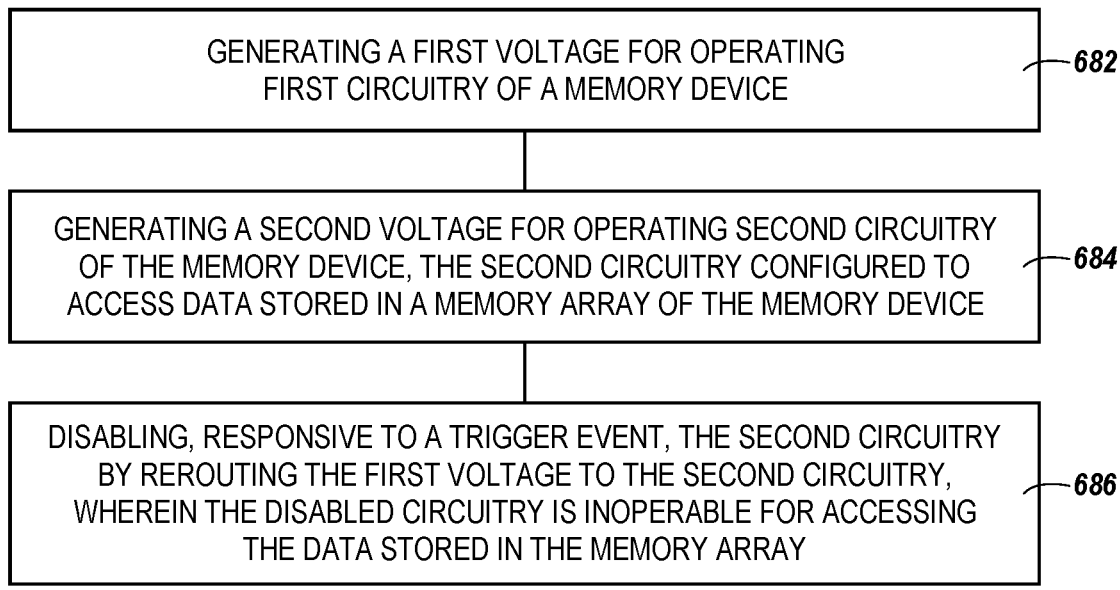
FIG. 6 illustrates an example flow diagram of a method for disabling memory responsive to security threats in accordance with a number of embodiments of the present disclosure.

FIG. 6 illustrates an example flow diagram of a method for disabling memory responsive to security threats in accordance with a number of embodiments of the present disclosure. The method can be executed by a memory device of a computing system.

At 682, a first voltage for operating first circuitry of a memory device can be generated. The first circuitry of a memory device can serve many functions within the memory device. In some examples, the first circuitry can be utilized for accessing data stored in the memory array of the memory device. In other examples, the first circuitry can be external to the memory device and may serve different functions for a memory system and/or a computing system hosting the memory device. The first circuitry can be configured to operate utilizing the first voltage.

At 684, a second voltage for operating second circuitry of the memory device can be generated. The second circuitry can be used to access data stored in a memory array of the memory device. The first voltage and the second voltage can be generated by a same source and/or can be generated from different sources. A source for generating the first voltage and the second voltage can comprise multiple stages. A first stage can be associated with the first voltage and a second stage can associated with the second voltage. The second circuitry can be configured to operate utilizing the second voltage.

At 686, responsive to a trigger event, the second circuitry can be damaged by rerouting the first voltage to the second circuitry to render it inoperable for accessing the data stored in the memory array. The second circuitry may not be configured to operate utilizing the first voltage. The first voltage can be rerouted to the second circuitry responsive to a trigger signal provided to a trigger circuit. The trigger circuit can be a single transistor or can be comprised of multiple circuit elements for various purposes. The trigger signal can be provided based on a trigger event. The trigger event can be an identified security threat that compromises the data stored in the memory array. The security threat may be a physical security threat and/or a logical security threat. A physical security threat can include, for example, the utilization of the memory device in a computing system unauthorized to utilize the memory device. A logical threat can include an unauthorized access to the data, among other possible threats. In other examples, the trigger event can comprise at least one of an identification threat to the memory device, a determined security breach of the memory device, and/or a determination that the memory device is in an unauthorized location.

In some examples, a different trigger signal can be provided to the trigger circuit to reroute the first voltage to third circuitry of the memory device. That is, the trigger circuit can receive multiple trigger signals where each of the trigger signals can reroute the first voltage to corresponding circuitry. The first voltage can be rerouted to the second circuitry by providing the first voltage to the second circuitry as a control signal. The first voltage can be provided to the third circuitry as a different control signal in order to damage the third circuitry to render it inoperable for accessing the data stored in the memory array. In some examples, the first voltage can be provided to the second circuitry and/or the third circuitry as a source voltage or a drain voltage to render the second circuitry and/or the third circuitry inoperable for accessing the data.

Rerouting the voltage generated by a voltage pump from the first circuitry to the second circuitry can provide the ability to save space and costs associated with implementing a voltage pump for the sole purpose of providing a voltage to the second circuitry. That is, a voltage pump that serves purposes other than providing a voltage to a second circuitry can be repurposed to provide the voltage to the second circuitry and may save the cost and die space associated with implementing a separate voltage pump for such purposes.

Although specific embodiments have been illustrated and described herein, those of ordinary skill in the art will appreciate that an arrangement calculated to achieve the same results can be substituted for the specific embodiments shown. This disclosure is intended to cover adaptations or variations of various embodiments of the present disclosure. It is to be understood that the above description has been made in an illustrative fashion, and not a restrictive one. Combinations of the above embodiments, and other embodiments not specifically described herein will be apparent to those of skill in the art upon reviewing the above description. The scope of the various embodiments of the present disclosure includes other applications in which the above structures and methods are used. Therefore, the scope of various embodiments of the present disclosure should be determined with reference to the appended claims, along with the full range of equivalents to which such claims are entitled.

In the foregoing Detailed Description, various features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method comprising:
   generating a first voltage for operating first circuitry of a memory device;
   generating a second voltage for operating second circuitry of the memory device, the second circuitry configured to access data stored in a memory array of the memory device; and
   disabling, responsive to a trigger event, the second circuitry by rerouting the first voltage to the second circuitry, wherein the disabled circuitry is inoperable for accessing the data stored in the memory array, wherein the memory device is configured to cease functioning responsive to the second circuitry being disabled.

2. The method of claim 1, further comprising rerouting the first voltage to the second circuitry responsive to a trigger signal provided to a trigger circuit.

3. The method of claim 2, further rerouting the first voltage to the second circuitry as a control signal to the second circuitry.

4. The method of claim 2, further comprising, providing a different trigger signal to the trigger circuit to reroute the first voltage to third circuitry of the memory device.

5. The method of claim 4, further comprising providing the first voltage to the third circuitry as a control signal to disable the third circuitry to render it inoperable for accessing the data stored in the memory array.

6. The method of claim 1, wherein the trigger event comprises at least one of:
   an identified threat to the memory device;
   a determined security breach of the memory device;
   an unauthorized attempt to access one or more rows of the memory device; or
   a determination that the memory device is in an unauthorized location; or any combination thereof.

7. The method of claim 1, wherein first voltage is greater than the second voltage.

8. The method of claim 1, wherein the first voltage is greater than a threshold voltage of the second circuitry.

9. An apparatus, comprising:
   an array of memory cells;
   access circuitry coupled to the array;
   triggering circuitry coupled to the access circuitry; and
   a voltage pump coupled to the triggering circuitry and configured to provide a first voltage to the triggering circuitry;
   wherein the triggering circuitry is configured to provide the first voltage to the access circuitry responsive to receipt of a triggering signal;
   wherein the access circuitry is configured to:
      receive a second voltage via a control line, wherein the second voltage is less than a threshold voltage of the access circuitry; and
      receive the first voltage via the control line, wherein the first voltage is greater than the threshold voltage such that the first voltage disables the access circuitry, and wherein the apparatus is configured to cease functioning responsive to the access circuitry being disabled.

10. The apparatus of claim 9, wherein the voltage pump is further configured to provide various operating voltages including the first voltage.

11. The apparatus of claim 9, wherein the voltage pump is further configured to dedicatedly provide the first voltage to the triggering circuitry.

12. The apparatus of claim 9, wherein the triggering circuitry is further configured to provide the first voltage to the access circuitry responsive to receipt of the trigger signal which is a control signal.

13. The apparatus of claim 9, wherein the trigger circuitry is configured to reroute the first voltage to a plurality of access circuitries responsive to receipt of a plurality of trigger signals including the trigger signal.

14. An apparatus, comprising:
   an array of memory cells;
   access circuitry and redundant access circuitry coupled to the array;
   control circuitry coupled to the access circuitry and the redundant access circuitry; and
   a voltage pump coupled to the control circuitry and configured to provide a first voltage;
   wherein the control circuitry is configured to cause the first voltage to be provided to the access circuitry responsive to receipt of a triggering signal;
   wherein the access circuitry is configured to:

receive a second voltage via a control line, wherein the second voltage is less than a threshold voltage of the access circuitry;

receive the first voltage via the control line, wherein the first voltage is greater than the threshold voltage to render the apparatus inoperable; and wherein the redundant access circuitry is configured to receive the second voltage via the control line to render the apparatus operable.

15. The apparatus of claim 14, wherein the second voltage is rerouted from the access circuitry to the redundant access circuitry utilizing a switch.

16. The apparatus of claim 14, wherein the redundant access circuitry is further configured to receive the first voltage via the control line to render the apparatus inoperable.

17. The apparatus of claim 14, wherein the control circuitry is configured to provide the first voltage to the redundant access circuitry responsive to receipt of a different trigger signal.

18. The apparatus of claim 17, wherein the trigger signal is provided to the control circuitry utilizing a first line and the different trigger signal is provided to the control circuitry utilizing a second line.

19. The apparatus of claim 14, wherein the second voltage is provided to redundant access circuitry via the control line responsive to the apparatus being rendered inoperable.

* * * * *